US005806759A

United States Patent [19]

Axisa

[11] Patent Number: 5,806,759

[45] Date of Patent: Sep. 15, 1998

[54] RECYCLING AND WASTE DISPOSAL APPARATUS

[76] Inventor: Anthony Axisa, 110 Kalinga Street, Ballina Quays, NSW, 2478, Australia

[21] Appl. No.: 822,240

[22] Filed: Mar. 20, 1997

[51] Int. Cl.[6] .................... B65G 11/04

[52] U.S. Cl. .................... 232/44; 232/43.1; 193/34

[58] Field of Search .................... 232/43.1, 43.5, 232/44, 43.2; 193/34, 5, 6, 33, 2 R

[56] References Cited

U.S. PATENT DOCUMENTS

| | | | |
|---|---|---|---|
| 2,177,328 | 10/1939 | Pender | 232/44 X |
| 2,792,171 | 5/1957 | Rosset . | |
| 2,802,434 | 8/1957 | Dowse . | |
| 3,171,447 | 3/1965 | Fowler et al. . | |
| 3,204,740 | 9/1965 | Legault | 232/44 X |
| 3,261,441 | 7/1966 | Mullens . | |
| 3,554,345 | 1/1971 | Mullens | 232/44 X |
| 4,013,215 | 3/1977 | Mercier | 232/44 X |
| 5,007,581 | 4/1991 | Douglas | 232/44 X |
| 5,213,402 | 5/1993 | Bernal et al. . | |

*Primary Examiner*—Kenneth J. Dorner
*Assistant Examiner*—William L. Miller
*Attorney, Agent, or Firm*—Abelman, Frayne & Schwab

[57] ABSTRACT

A waste disposal apparatus is built-in to a wall of a building so as to enable waste, which may be sorted into recyclable and non-recyclable waste within the building, to be dispensed into garbage bins (69) or the like located at the outside of the building. The apparatus includes a plurality of modular chutes (74, 75) for transfer of waste to the bin (69) and wall fascia (45, 46, 47). There is an inlet port for each chute which is substantially co-planar with the wall (52) and a pivotable door (47) for each chute, whereby each pivotable door (47) controls entry of waste through its respective inlet port.

7 Claims, 10 Drawing Sheets

RECYCLING AND WASTE DISPOSAL APPARATUS

FIELD OF INVENTION

The present invention relates to waste disposal apparatus and, in particular, to a chute assembly for use in buildings for the recycling of waste materials.

BACKGROUND ART

Conventional waste disposal apparatus of the type that are built into a wall of a home or office are of a fixed construction with little or no ability to be modified for the changing recycling needs of the user.

In cases where the waste disposal apparatus includes a plurality of chutes, and each chute is adapted for conveying a particular class of recyclable material and non-recyclable material, the chutes are formed as a collective, inseparable unit. For example, U.S. Pat. No. 5,213,402 discloses an insulated hollow interior cabinet built into a home or office wall which has an exterior door for opening and closure of the cabinet, and five apertures located therein that connect to respective chutes for transfer of the waste into bins or the like. Each of the apertures is formed through a plate and the chutes are connected to the underside of the plate such that any modification or reconfiguration in the structure of the system to facilitate the changing recycling needs of the user will necessitate considerable reconstruction of at least the plate, aperture and chutes. Also, each aperture does not have an individual door to service its respective chute and so unwelcome smells or the like may be present whenever the exterior door is opened or when the exterior door is not sealed efficiently upon closure.

There is, therefore, a need for a waste disposal chute assembly for use in buildings that may be both built into a wall of the building and readily configured to suit the needs of the user, such as by configuring a single, double or triple chute assembly at the time of installation or at a later time.

There is also a need for a waste disposal chute assembly in which a plurality of chutes may be accessed through individual doors.

It is a another object of the present invention to provide a waste disposal chute assembly that can be used with divided bins.

It is yet another object of the present invention to provide a waste disposal chute assembly that overcomes the shortcomings of the prior art and is easy to assemble and disassemble, occupies minimal space and is aesthetically appealing.

SUMMARY OF THE INVENTION

According to the invention, there is provided a waste disposal apparatus adapted to be built into a wall of a building, said apparatus including a plurality of chutes for transfer of waste to a bin or the like, means for interconnecting the said chutes together, each chute having an inlet port and an outlet port, the inlet port of each chute being substantially co-planar with the said wall, and door means for each chute, each of the said door means being adapted to control entry of waste through its respective inlet port.

Preferably, the chutes are interconnected by a chute fascia.

Preferably, each of the door means comprise a pivotable door that may be supported by the chute fascia.

It is also preferred that each chute includes telescoping means for adjusting the chute length.

The outlet port of each chute may be connected to an adjustable duct for the bin or the like.

In another preferred form, the chutes include air venting means.

DESCRIPTION OF THE PREFERRED EMBODIMENT

Figure 1:
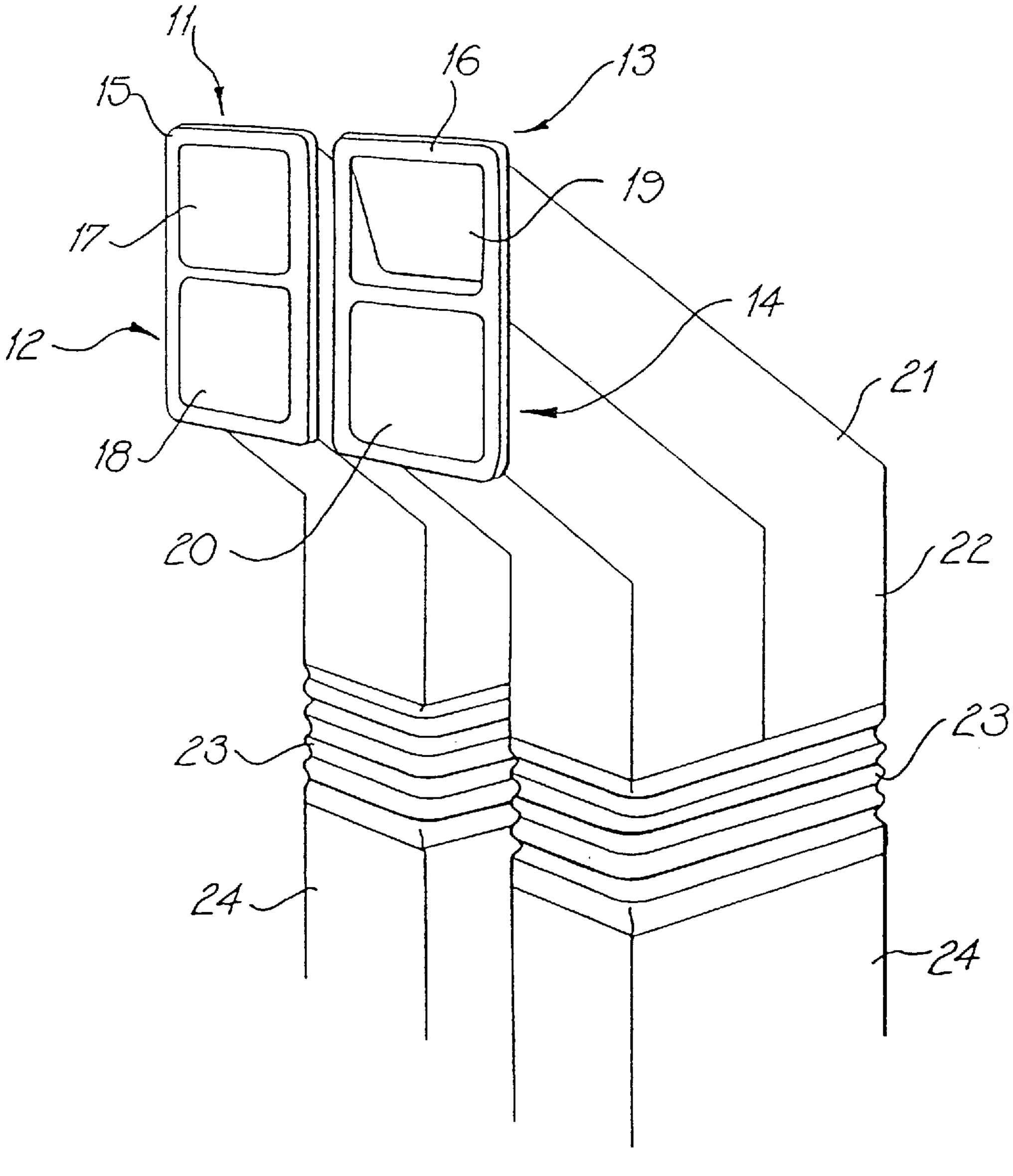
Figure 2:
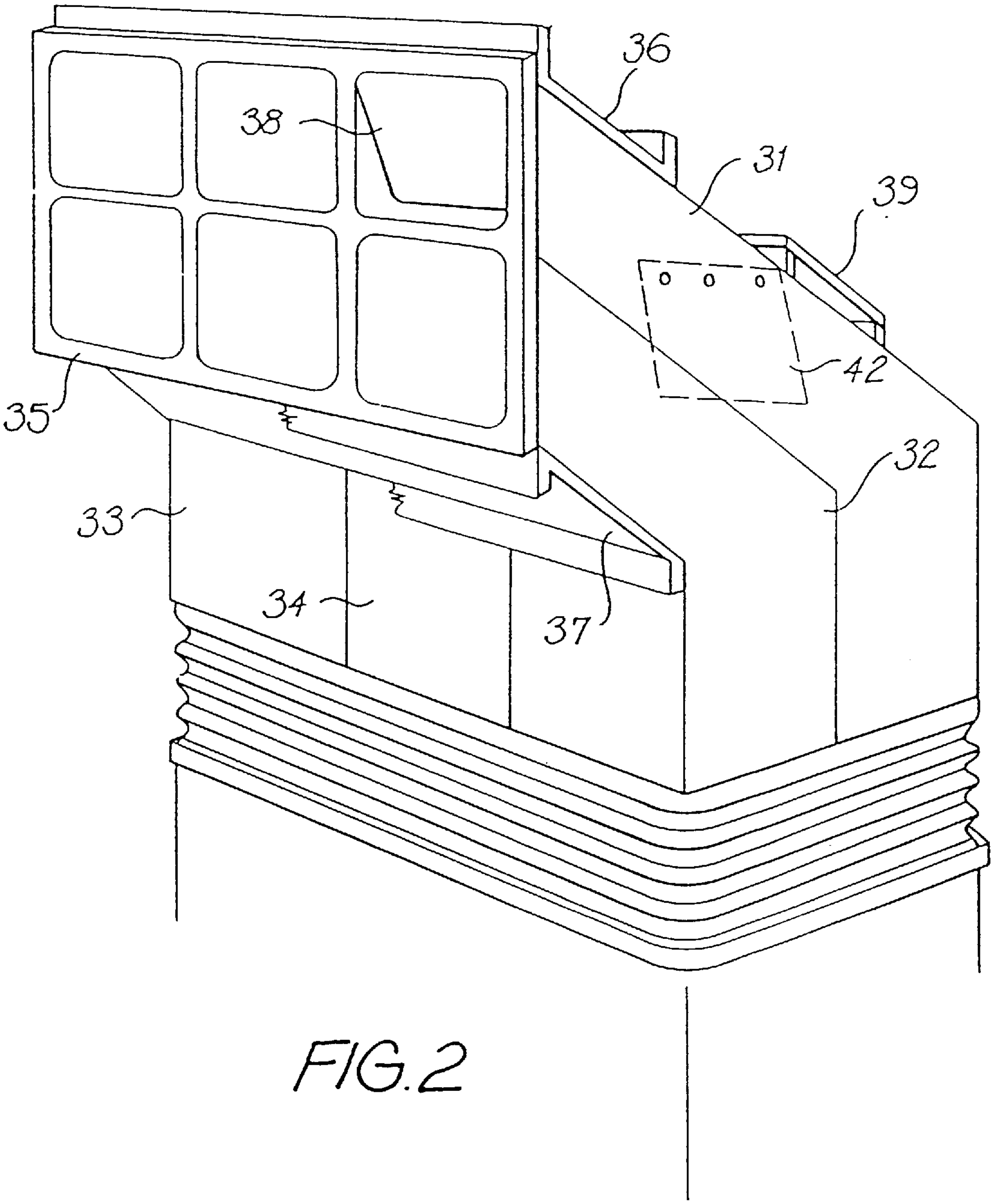
Figure 3:
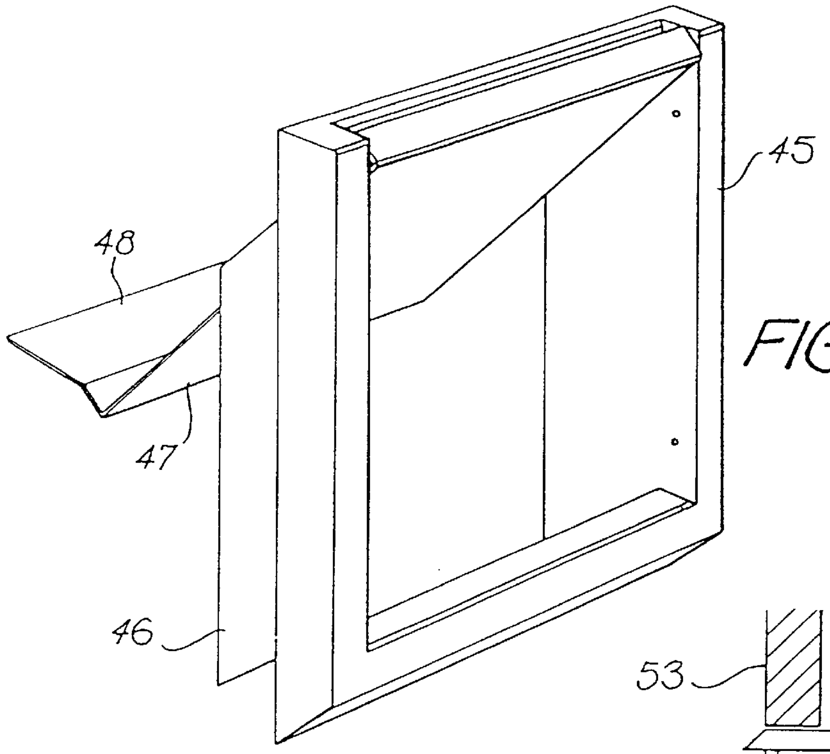
Figure 4:
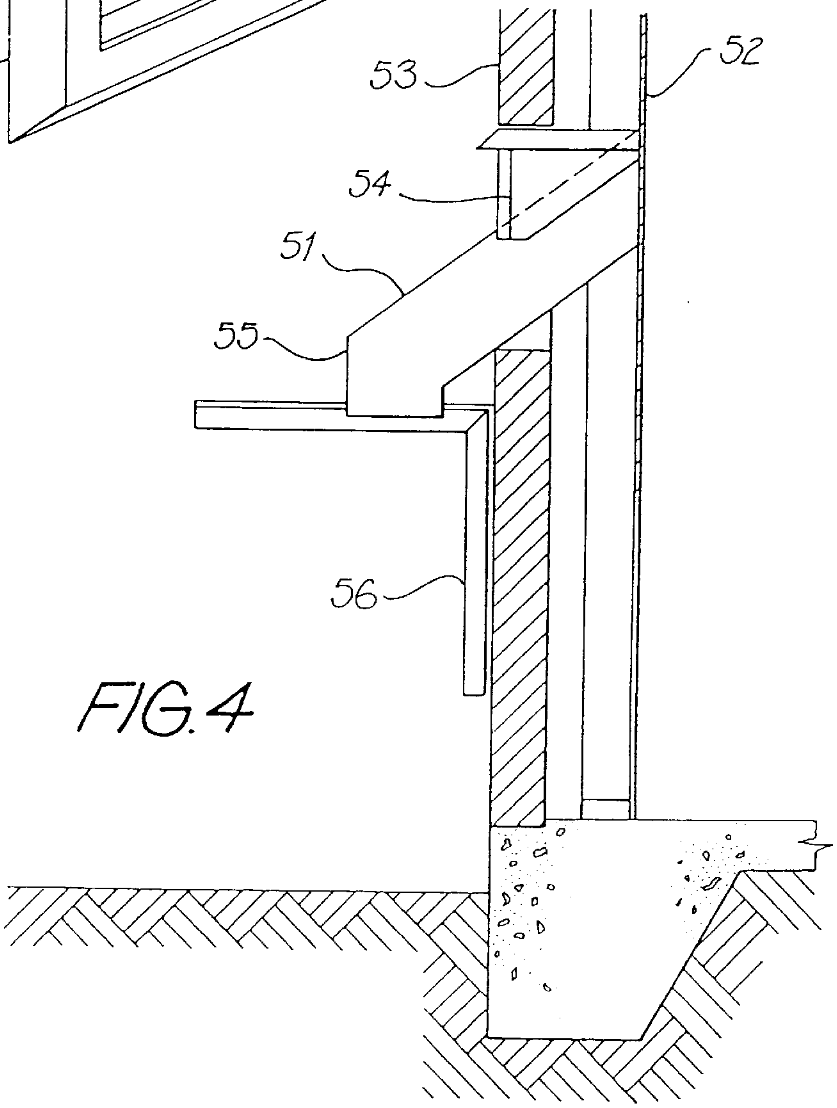
Figure 6:
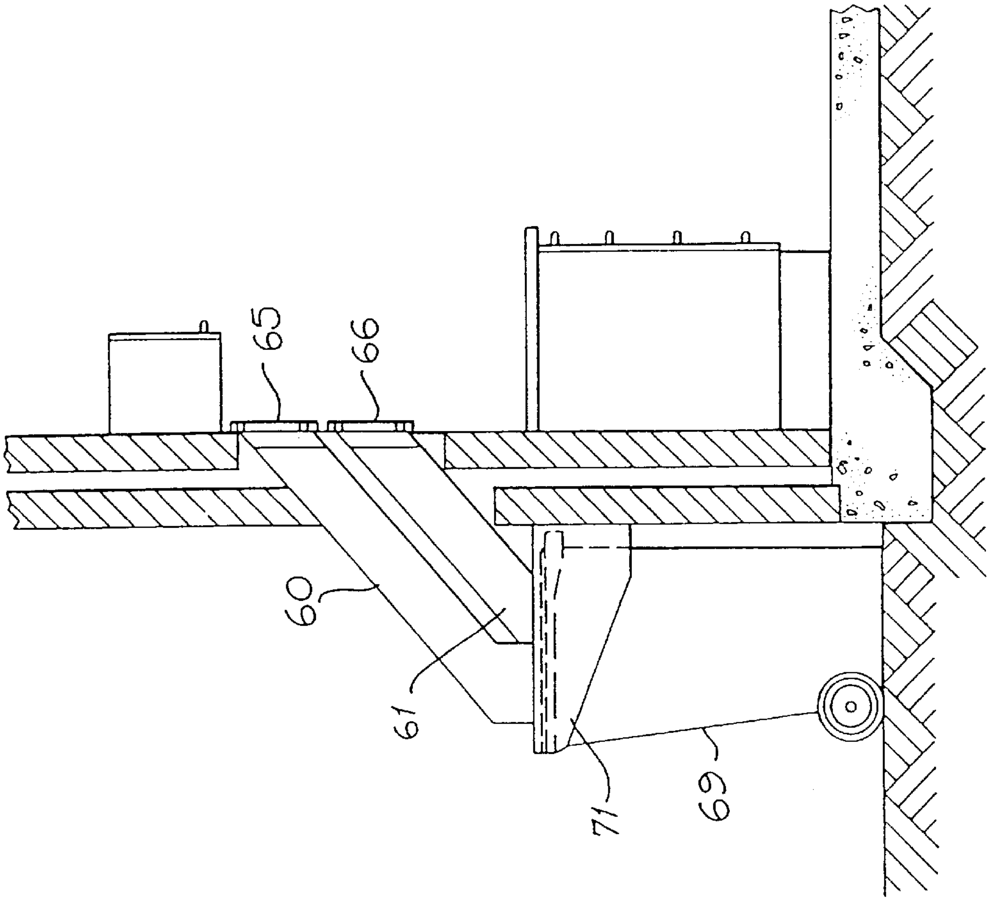
Figure 5:
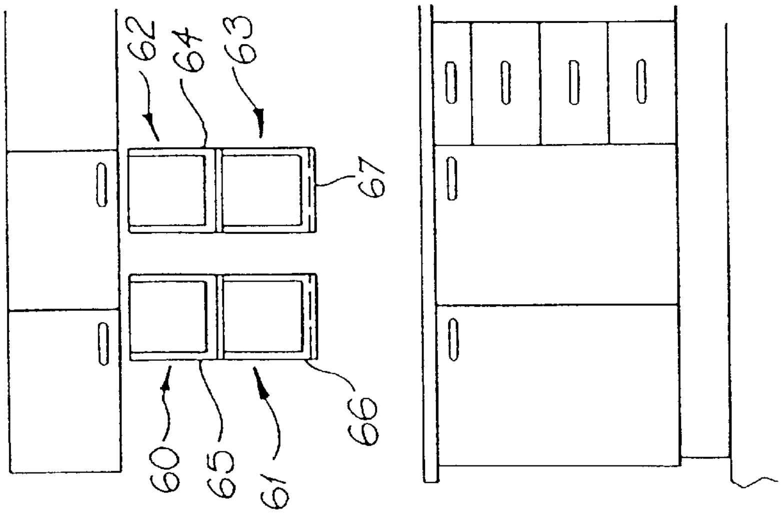
Figure 8:
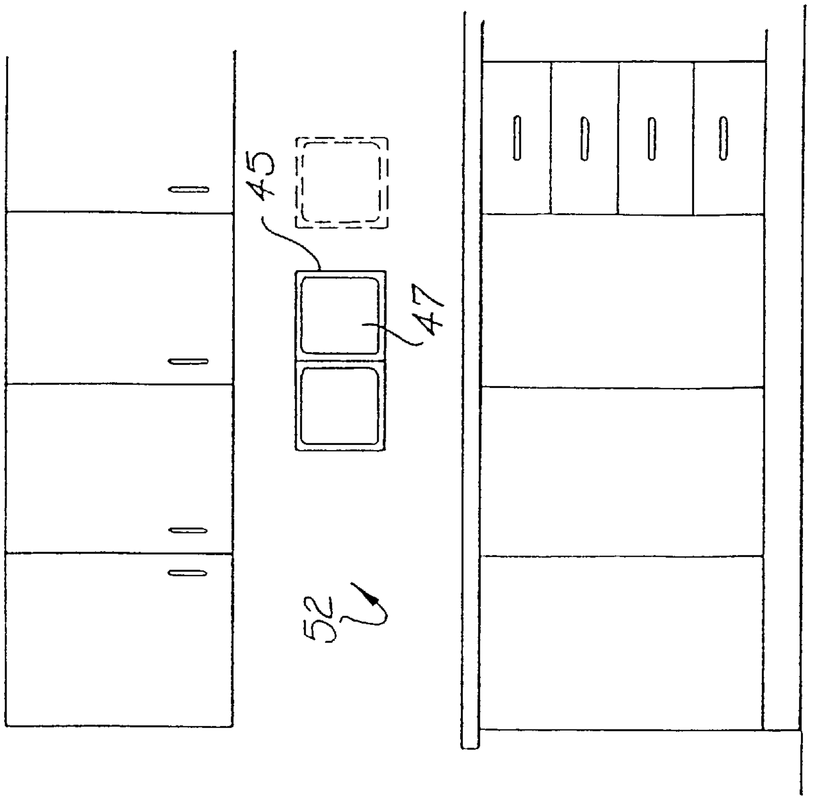
Figure 7:
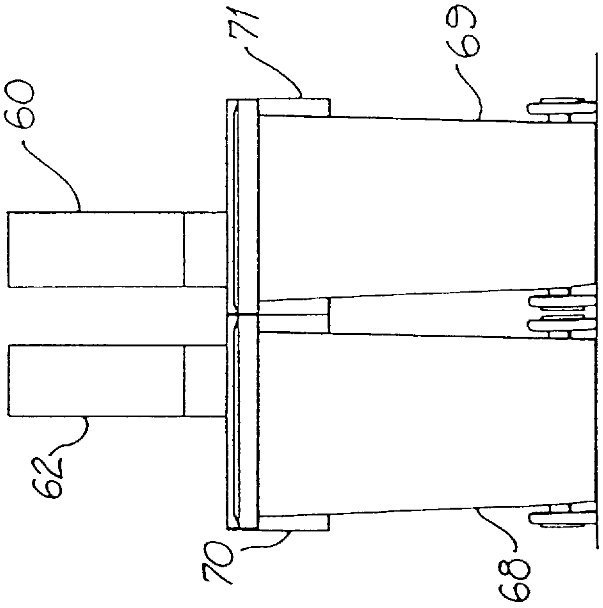
Figure 10:
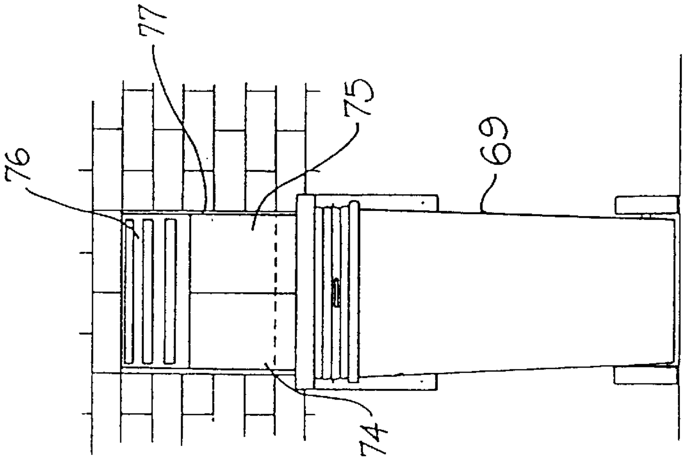
Figure 9:
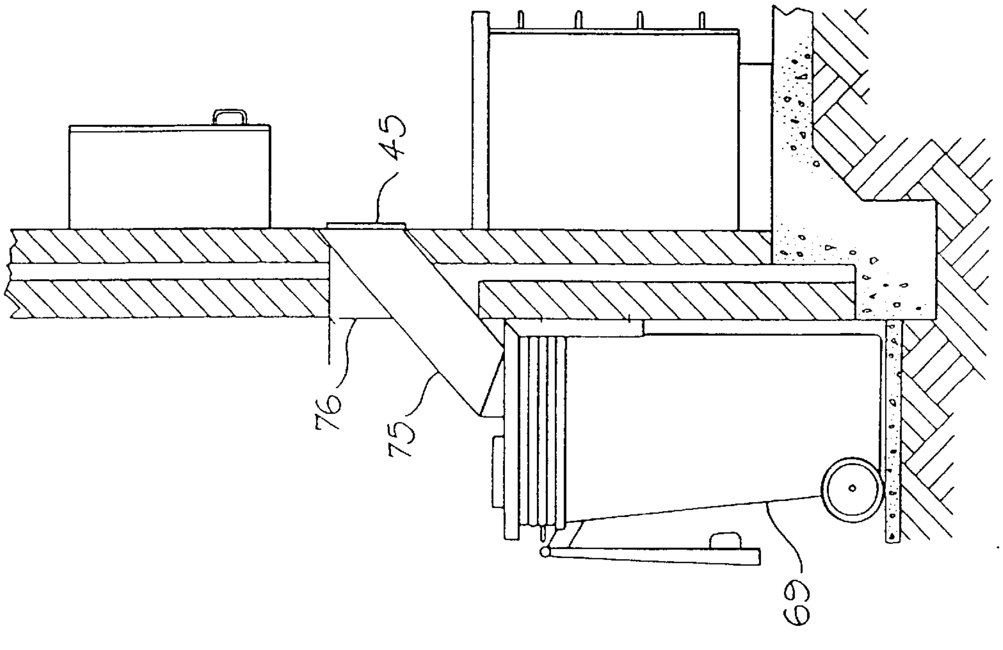
Figure 11:
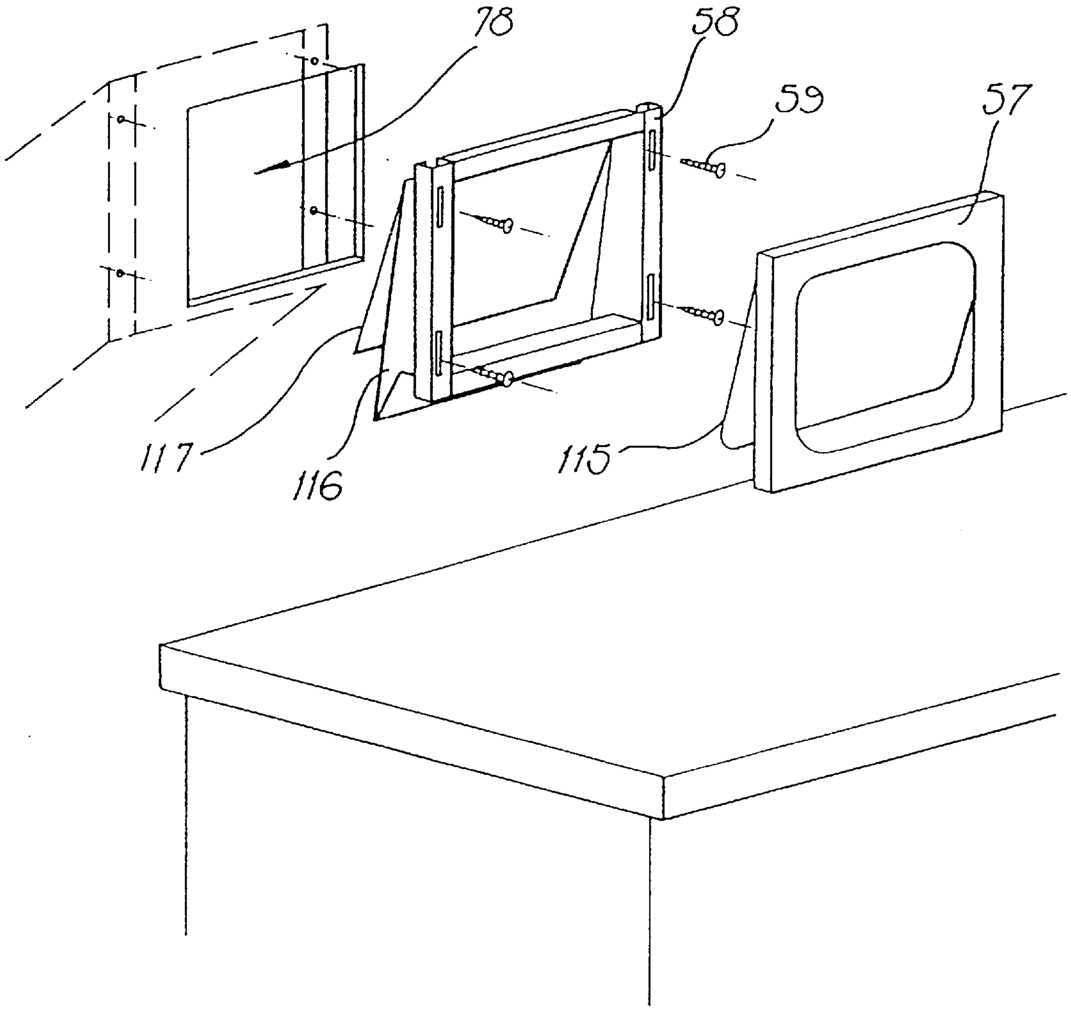
Figure 12:
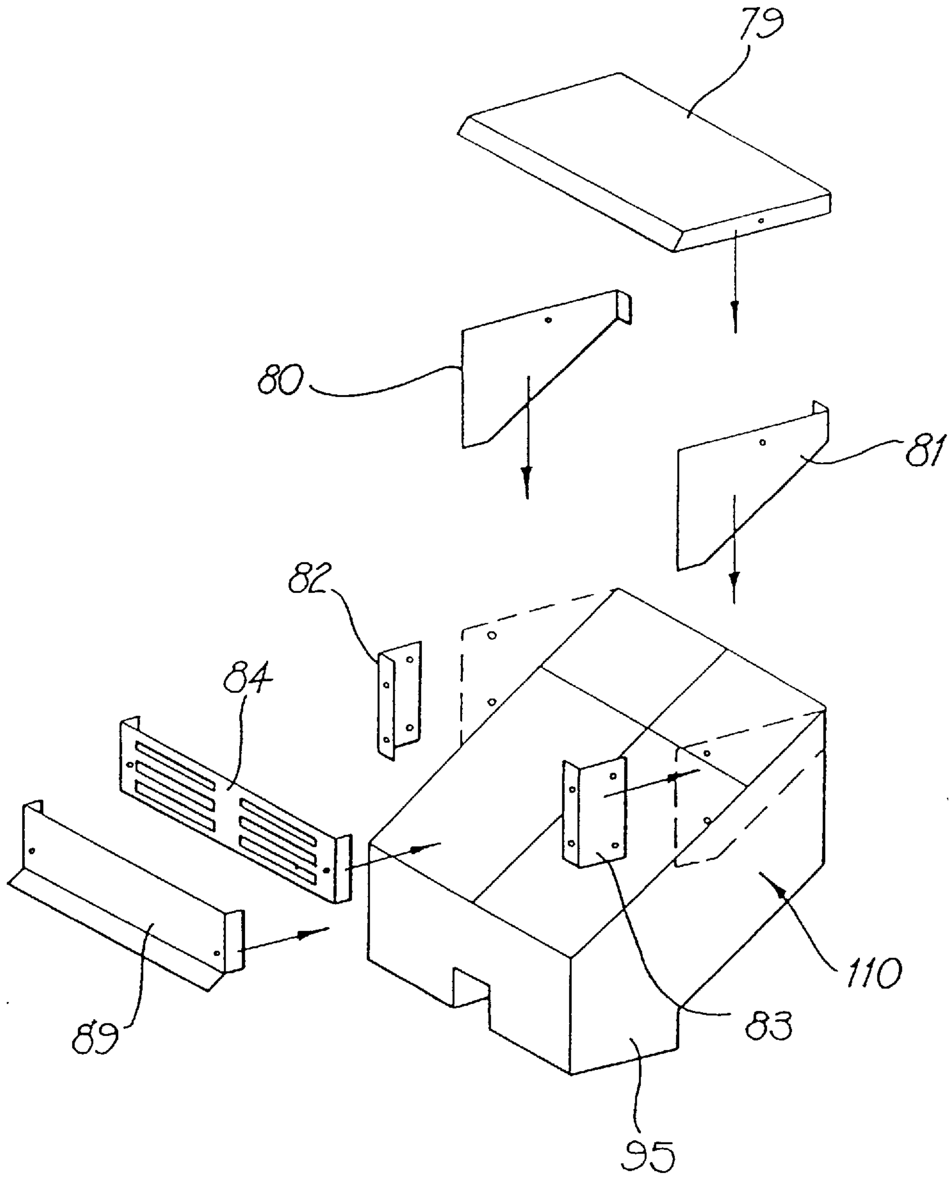
Figure 13:
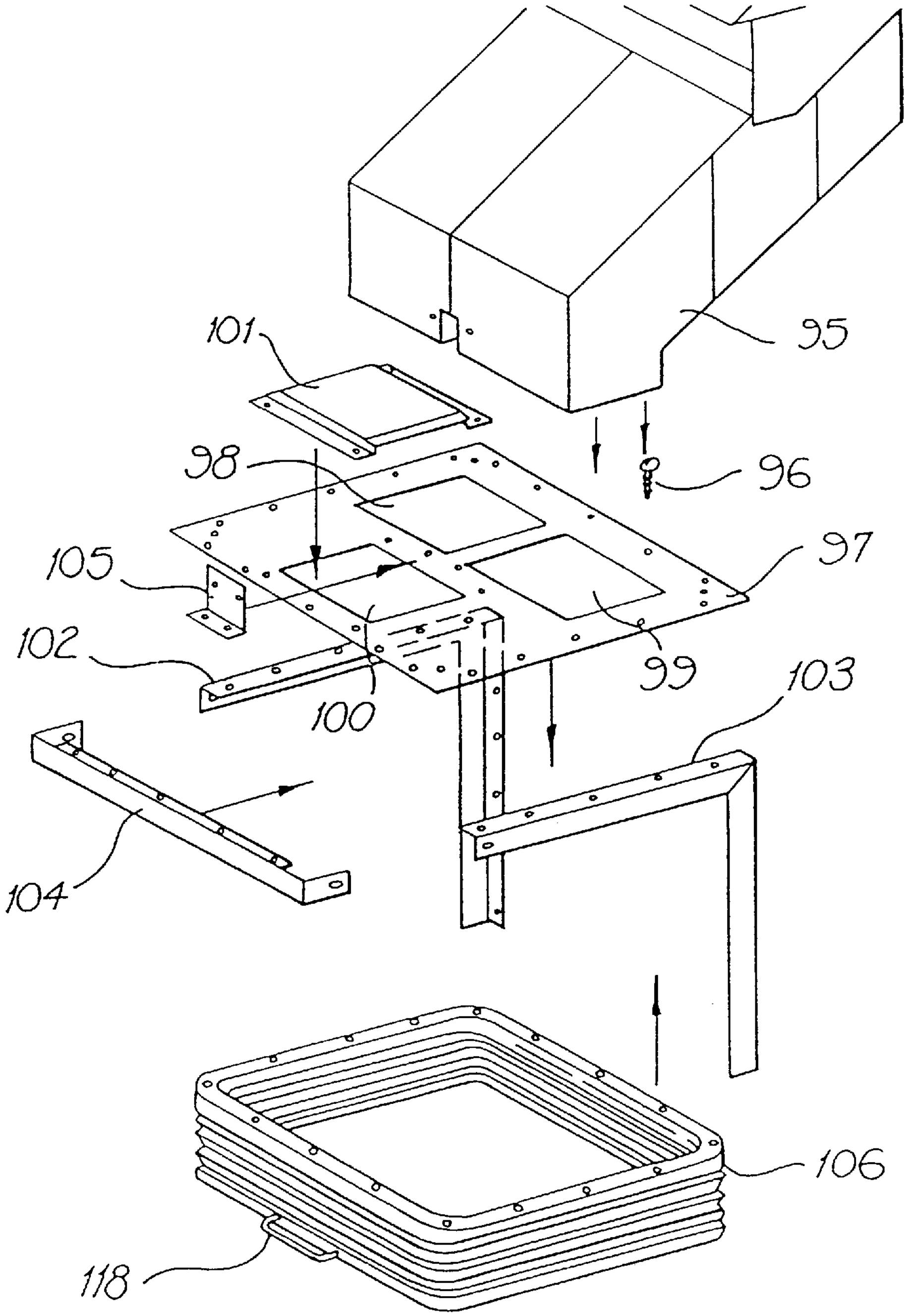
Figure 14:
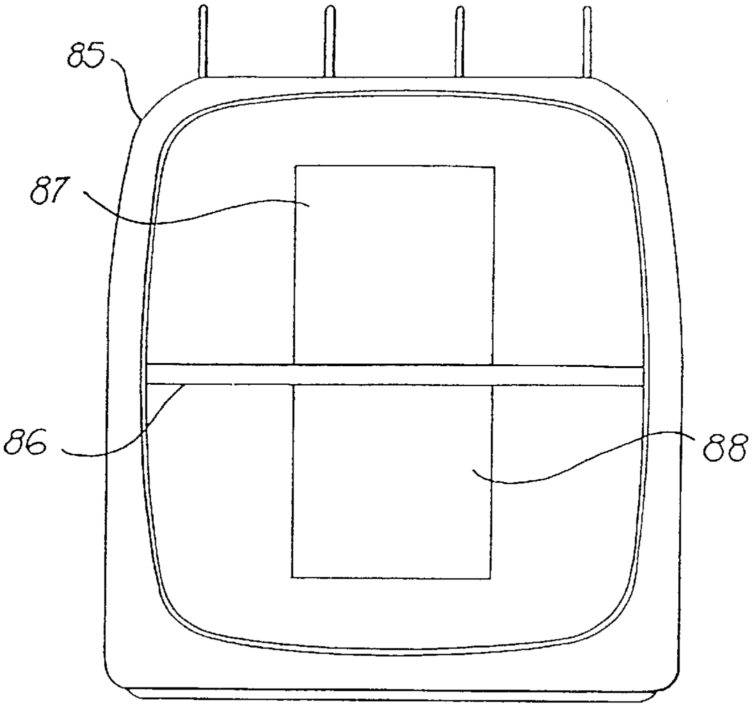
Figure 15:
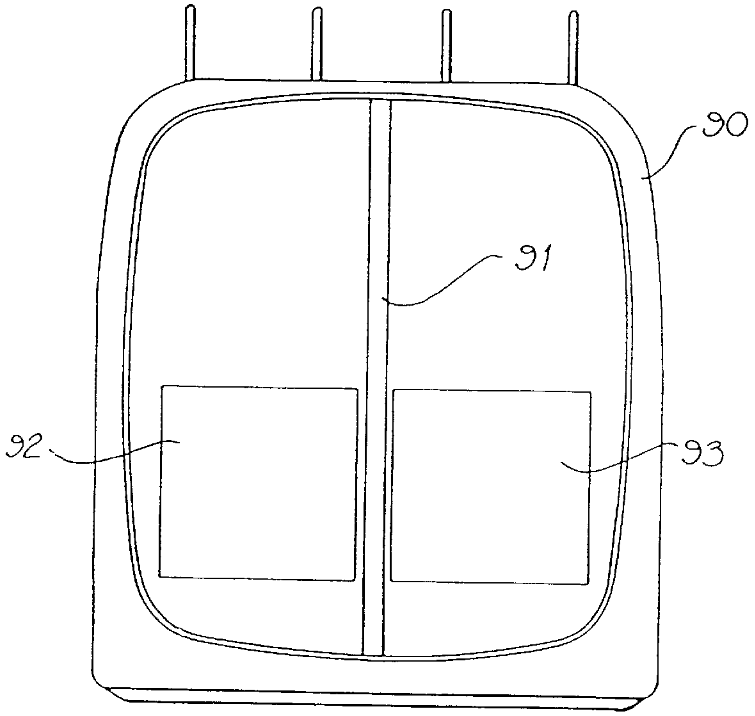

In order that the invention may be readily understood and put into practical effect, reference will be made to the accompanying drawings, in which:

FIG. 1 is a perspective view of a waste disposal apparatus according to a first embodiment of the present invention, FIG. 2 is a perspective view of a waste disposal apparatus according to a second embodiment of the present invention, FIG. 3 is a perspective view of a chute fascia and pivotable door for an individual chute of the apparatus of FIGS. 1 or 2, FIG. 4 is a side sectional view of part of a waste disposal apparatus according to a third embodiment of the present invention, FIG. 5 is a front elevational view of a conventional domestic kitchen setting that includes the waste disposal apparatus of FIG. 4, FIG. 6 is a side view of the waste disposal apparatus of the kitchen setting of FIG. 5 shown through a section of wall and connected to a bin arrangement, FIG. 7 is a front elevational view of the external wall chute and bin arrangement of FIG. 6, FIG. 8 is a front elevational view of a conventional domestic kitchen setting that includes waste disposal apparatus according to a fourth embodiment of the present invention, FIG. 9 is a side view of the waste disposal apparatus of the kitchen setting of FIG. 8 shown through a section of wall and connected to a bin arrangement, FIG. 10 is a front elevational view of the external wall chute and bin arrangement of FIG. 9, FIG. 11 is an exploded perspective view of a door assembly for the waste disposal apparatus of FIG. 8, FIG. 12 is an exploded perspective view of a chute vent box for the waste disposal apparatus of FIG. 8, FIG. 13 is an exploded perspective view of a bin connecting assembly for the chutes of the waste disposal apparatus of FIG. 8, FIG. 14 is a sectional plan view of a bin for receiving a chute arrangement as shown in FIG. 7, and FIG. 15 is a sectional plan view of a bin for receiving a chute arrangement as shown in FIG. 10.

The waste disposal apparatus of FIG. 1 consists of four chutes 11, 12, 13 and 14 in which two pairs of chutes are interconnected by fascia 15 and 16, adapted for location against an internal wall of a building, and by screws or rivets (not shown).

Each of the chutes 11 to 14 conforms to a modular design whereby the chutes may be readily configured or reconfigured into a wall arrangement so as to suit the needs of the user.

Each chute 11 to 14 has an entry port which is normally closed by self closing, one-way, pivotal sealing flaps 17, 18, 19 and 20 respectively. Sealing flap 19 is shown partly open.

Each of the chutes has an angularly inclined upper portion 21 and a vertical lower portion 22. The lower portions of each pair of interconnected chutes are connected to a flexible concertina-type connecting duct 23 that is attached to a bin or the like waste receiving receptacle 24. In this way, waste dumped through the entry ports falls under gravity through the chutes into a bin or the like.

The upper portion 21 may be telescopically extendible so as to adjust its length.

The chutes 11 to 14 and fascia 15 and 16 may be made of a recyclable or recycled plastic material, such as polyurethane, or from stainless steel, aluminium or galvanised zinc sheeting.

The waste disposal apparatus of FIG. 2 has six modular chutes (only chutes 31, 32, 33 and 34 shown) each interconnected as shown by fascia 35 and load bearing top and bottom supports 36 and 37 and by screws or rivets. The load bearing supports 36 and 37 are adapted to support the load exerted by a wall (not shown) through which the apparatus is built. The vertically inclined portions of the load bearing supports 36 and 37 are adapted to abut against the inside building and outside building surfaces of the wall.

The angularly inclined upper portions of the chutes may include telescoping means for adjusting chute length.

Each chute has a self closing, one-way, pivotal sealing flap (such as shown by partly open flap 38 at the inlet port of chute 31). An air vent 39 is provided at the upper portion of each chute to remove odours from within the apparatus to the outside. There is also an internal pivotal flap (such as flap 42 shown in dotted outline in chute 31) within each chute.

As with the apparatus of FIG. 1, the lower portions of the chutes of the apparatus of FIG. 2 are connected to a flexible connecting duct 40 that is attached to a bin 41.

In a modified form, the apparatus of FIGS. 1 and 2 may have their inlet ports located substantially co-planar with a wall by individual fascia that surround only the inlet port of the one chute. In this form, each chute would no longer be interconnected by a single fascia, but would be interconnected by other means, such as the load bearing supports mentioned with respect to FIG. 2 or by screws or rivets.

Also, the present invention embraces means for adjusting the chute length. Although this may in some cases be achieved by the use of a flexible connection duct as mentioned above, the present invention includes the use of chute telescoping means comprising slideable overlapping portions of chute.

FIG. 3 shows a fascia for an inlet port of a single chute. The fascia includes a bezzle 45, a bezzle mounting bracket 46 and a pivotable door 47 that has a lower bent portion 48 for improved sealing action. In this embodiment, the door 47 is made of stainless steel and the bezzle is made of resin injected fibreglass.

FIG. 4 illustrates a portion of a waste disposal apparatus (lacking a door assembly) in which two modular chutes (only chute 51 shown) are aligned horizontally. The chutes pass angularly downwardly from an opening in the inside wall 52 to an opening in the outside wall 53. There is a vent box 54 for the chutes located flush with the outside wall 53. Affixed to the vertical portion 55 of the chutes are a pair of L-shaped wall brackets (only bracket 56 shown), the horizontal part of which connects to the upper portion of a flexible connecting duct and the vertical part of which connects rigidly to a wall. Although not shown, the flexible connecting duct is adapted to fit around the opening of a bin or the like and seal the contents of the bin from the outside.

The waste disposal apparatus illustrated in FIGS. 5, 6 and 7 comprise four modular chutes 60, 61, 62 and 63 in which two pairs of chutes are aligned vertically, each chute having its own fascia 64, 65, 66 and 67 but each vertically aligned pair of chutes being interconnected by interconnecting means. The bins 68 and 69, into which waste from each of the chutes falls, are connected to bin hoods 70 and 71 which are attached to the outside wall and provide a barrier to entry of other material into the bins other than through the chutes. As evident in FIGS. 5 and 6, the location of the inlet ports for the chutes 60 to 63 should be convenient to the user, and a kitchen setting where food or other recyclable waste products are encountered regularly is particularly preferred.

FIGS. 8, 9 and 10 show the waste disposal apparatus of the present invention consisting of two modular chutes 74 and 75 in which the two chutes are aligned horizontally. The apparatus includes a chute vent box 76 located in the wall space above the chutes 74, 75 that provides venting of air in to and out of the chutes. Silicon sealant 77 is provided around the opening of the wall through which the chutes 74, 75 pass. The opening or cut-out required in the inner wall is therefore smaller than the opening required in the outer wall. In all other respects, the apparatus of FIGS. 8, 9 and 10 is identical to that of FIGS. 5, 6 and 7. Unless otherwise stated, features are identified in FIGS. 8, 9 and 10 with the same numerals as are used to identify the features in the preceding Figs.

FIG. 11 shows, in exploded form, a chute fascia and door assembly that may be employed in the waste disposal apparatus of FIG. 4. The assembly includes an outer door frame 57 that is visible to the user, an inner door frame 58 to which the outer door frame is connected by interference fit, the inner door frame 58 being itself connected by screws 59 to the inner wall at locations surrounding the inner wall opening 78.

The outer door frame 57 or fascia bezzle supports an outer door 115 that can pivot upwardly about a horizontal plane adjacent its upper edge under the pressure exerted by the hand of a user passing through the frame 57 and that will return to a vertical resting position under gravity. The outer door 115 has sealing and noise buffering means, such as a strip of rubber or foam material, fixed along the length of both its vertical edges and its lower edge.

The inner door frame 58 has a mounting bracket 116 extending rearwardly therefrom that extends further from the bottom of the frame 58 than from the top of the frame 58. An inner door 117 is pivotally spring mounted about the top of bracket 116 so as to press flatly around the outermost rim of the bracket 116 at an angle that is offset from the vertical plane. The inner door 117 includes sealing means, such as a peripheral lip, to ensure that odours do not permeate from the bin or other receptacle back-through the outer door frame 57 into the house, particularly when the outer door frame 57 with its attached outer door 115 is removed for cleaning purposes. The inner door 117 also ensures that odours will be directed out of the chutes through the chute vent box and provides an aesthetically appealing appearance when the outer door frame 57 is removed.

The chute vent box shown in exploded form in FIG. 12 consists of a vent top 79, a pair of vent sides 80, 81 and vent brackets 82, 83, a vent plate 84 and vent front 89. The chute vent box, when assembled, is located in the outer wall space above the chutes 95 and serves both chutes. Individual vent boxes may be provided for each chute. The chutes 95 are each telescopically extendible across gap 110.

FIG. 13 illustrates, in exploded form, the bin connecting assembly for the chutes shown in FIG. 12. Connected by screws 96 to the chutes is a bin hood 97 having three square shaped apertures 98, 99, 100. Apertures 98, 99 allow communication with the chute openings or outlet ports and aperture 100 has a bin vent 101 attached thereto. The bin hood 97 is fastened to a pair of wall brackets 102, 103 and a front bracket 104 affixed to the front edge of the hood 97. A cover plate 105 is affixed to both the hood 97 and adjacent portions of chutes. The rubber seal at the top rim of the flexible rubber duct 106 is connected to the brackets 102, 103 and 104.

The duct 106, by its weight, asserts sufficient downward pressure on the top of the bin to seal the bin from odours and insects and to lock the bin in a stable position against the ground. When access to the exterior of the bin is required by a person outside the house or when the bin needs to be moved, a person may readily lift, say with one finger engaged on the handle 118, the duct 106 clear of the bin.

The bins shown open in FIGS. 14 and 15 have been adapted for use with the waste disposal apparatus of the present invention.

In FIG. 14, the cavity of bin 85 has been divided into two approximate "east-west" halves by a divider 86 so that the outlet ports 87 and 88 of a pair of vertically aligned chutes (as shown in FIGS. 5 to 7) may feed into separate compartments of the bin to facilitate the recycling process.

In FIG. 15, the cavity of bin 90 has been divided into two approximate "north-south" halves by a divider 91 so that the outlet ports 2 and 93 of a pair of horizontally aligned chutes (as shown in FIGS. 8 to 10) may also feed into separate bin compartments.

Different bin hoods will not be required in the arrangements of FIGS. 14 and 15 as all that will be required is the reorientation of the duct 106 with respect to the brackets 102, 103, 104 and the location of the divided bin in such a way that the position of its divider matches the position of the hood apertures. Similarly, the bin hood 97 may readily suit single non-split bins, dual bins, crates or tubs and bags and all other kinds of waste or recycling receptacles.

Various modifications may be made in details of design and construction without departing from the scope or ambit of the invention.

I claim:

1. A waste disposal apparatus adapted to be built into a wall of a building, said apparatus including a plurality of chutes for transfer of waste to a bin, means for interconnecting the chutes together, each of said chutes having an inlet port and an outlet port, the inlet port of each of said chutes being substantially co-planar, a door attached to the inlet port of each of said chutes, said door being adapted to control entry of the waste through the respective inlet port, each of said chutes being connected to an adjustable duct, a bin hood located around the outlet port of each of said chutes and the bin hood being sealingly connected to the adjustable duct such that the bin hood is positioned between the outlet port of each of said chutes and the adjustable duct.

2. The waste disposal apparatus of claim 1 wherein the chutes are interconnected by a chute fascia.

3. The waste disposal apparatus of claim 2 wherein the door comprises a pivotable door.

4. The waste disposal apparatus of claim 3 wherein the pivotable door is supported by the chute fascia.

5. The waste disposal apparatus of claim 1 wherein each of said chutes include telescoping means for adjusting the length.

6. The waste disposal apparatus of claim 1 wherein the chutes include air venting means.

7. The waste disposal apparatus of claim 1 wherein the bin hood includes an aperture to which a bin vent is connected.

* * * * *